(12) United States Patent
Vasse et al.

(10) Patent No.: US 8,931,631 B2
(45) Date of Patent: Jan. 13, 2015

(54) VERSATILE REGULATING UNIT FOR A STREAM OF CONTAINERS

(75) Inventors: Michael Vasse, Octeville-sur-Mer (FR); Lionel Daniere, Octeville-sur-Mer (FR); Gregory Choplin, Octeville-sur-Mer (FR)

(73) Assignee: Sidel Participations, Octeville sur Mer (FR)

( * ) Notice: Subject to any disclaimer, the term of this patent is extended or adjusted under 35 U.S.C. 154(b) by 0 days.

(21) Appl. No.: 13/879,942

(22) PCT Filed: Oct. 17, 2011

(86) PCT No.: PCT/FR2011/052423
§ 371 (c)(1),
(2), (4) Date: Apr. 17, 2013

(87) PCT Pub. No.: WO2012/056145
PCT Pub. Date: May 3, 2012

(65) Prior Publication Data
US 2013/0199897 A1    Aug. 8, 2013

(30) Foreign Application Priority Data
Oct. 28, 2010    (FR) ..................................... 10 58903

(51) Int. Cl.
*B65G 21/20*    (2006.01)
*B65G 19/02*    (2006.01)
(Continued)

(52) U.S. Cl.
CPC ............ *B65G 19/02* (2013.01); *B65G 21/2072* (2013.01); *B65G 47/088* (2013.01); *B65G 47/841* (2013.01); *B65G 2047/686* (2013.01); *B65G 2201/0244* (2013.01)

USPC ..................................... 198/836.3; 198/836.1

(58) Field of Classification Search
USPC ................. 198/725, 728, 836.1, 836.3, 861.1
See application file for complete search history.

(56) References Cited

U.S. PATENT DOCUMENTS 2,951,574 A     9/1960  Craig
4,302,919 A  *  12/1981 Hartness ........................ 53/250
(Continued)

FOREIGN PATENT DOCUMENTS

EP          1247769 A1    10/2002
WO       2010037959 A1     4/2010

OTHER PUBLICATIONS

International Search Report dated Dec. 16, 2011 in corresponding International Patent Application No. PCT/FR2011/052423.

*Primary Examiner* — Douglas Hess
(74) *Attorney, Agent, or Firm* — Sughrue Mion, PLLC (57) ABSTRACT

A regulating unit inserted in an installation for preparing batches of containers of the bottle kind. The unit is interposed between an upstream conveyor and a downstream conveyor and at each of its ends, between two adjacent walls (16), includes a mechanism for centering each conveyor module (9). These mechanism includes arms (25) of the same length forming a pair of compasses between two adjacent walls (16), which pair of compasses has a central articulation secured to the conveying module (9) by a sliding connection located in the mid-plane of the corresponding lane. The walls (16) are connected to one another by a pantograph system (30) and a connecting member, having a link rod (35) extending between the pair of compasses and the pantograph to collaborate with the corresponding support of the conveying module (9) in order to keep it in the mid plane of the corresponding lane.

10 Claims, 5 Drawing Sheets

(51) Int. Cl.
  *B65G 47/08* (2006.01)
  *B65G 47/84* (2006.01)
  *B65G 47/68* (2006.01)

(56) References Cited

U.S. PATENT DOCUMENTS

| | | | |
|---|---|---|---|
| 4,805,760 A * | 2/1989 | Treiber | 198/456 |
| 5,101,959 A * | 4/1992 | Whitby | 198/456 |
| 5,137,140 A * | 8/1992 | Lecrone | 198/732 |
| 5,676,239 A * | 10/1997 | Mason | 198/836.1 |
| 5,735,378 A * | 4/1998 | Sundquist | 193/35 C |
| 5,918,726 A * | 7/1999 | Temmink | 198/418.6 |
| 6,209,707 B1 * | 4/2001 | Ronchi | 198/445 |
| 6,944,943 B2 * | 9/2005 | Cho et al. | 29/740 |
| 7,207,428 B2 * | 4/2007 | Huttner | 198/444 |
| 7,721,876 B2 * | 5/2010 | Hartness et al. | 198/836.3 |
| 8,132,665 B2 * | 3/2012 | Pawelski | 198/836.3 |
| 8,490,776 B2 * | 7/2013 | Seger et al. | 198/442 |
| 8,613,354 B2 * | 12/2013 | Seger et al. | 198/836.1 |
| 8,651,264 B2 * | 2/2014 | Spindler et al. | 198/446 |
| 8,668,073 B2 * | 3/2014 | Petrovic et al. | 198/452 |

* cited by examiner

VERSATILE REGULATING UNIT FOR A STREAM OF CONTAINERS

CROSS REFERENCE TO RELATED APPLICATIONS

This application is a National Stage of International Application No. PCT/FR2011/052423 filed Oct. 17, 2011, claiming priority based on French Patent Application No. 10 58903, filed Oct. 28, 2010, the contents of all of which are incorporated herein by reference in their entirety.

The invention relates to a unit, in the field of installations for preparing batches of bottle-type containers, which comprises at least two passages separated by walls for which the distance between them is adjustable, each passage being equipped with a conveying module which supports and advances containers to be regulated, said unit achieving the regulation of the stream of containers by means of sets of fingers and being placed between an upstream conveyor and a downstream conveyor, which can be a conveyor that feeds a packaging machine for example.

More specifically, the invention relates to an adjustment system which adapts the position of the active elements of this regulating unit to the dimensions of the containers that pass through it.

Document WO 2010/037959 shows an installation which prepares batches of bottles from a stream consisting of several lines of containers whose advancement is controlled and organized in a regulating unit that includes a conveying system comprising endless belt conveying modules arranged in each passage and sets of fingers acting as stops, the fingers being inserted between two consecutive containers in the same line in order to control and organize the forward movement of these containers at said regulating unit.

Said document also teaches means for adjusting the width of the passages at the regulating unit in order to adapt this width to the dimensions of the containers and to do so as precisely as possible. Complementary means are also installed in each conveying module, for centering and maintaining said module in the mid-plane of its passage regardless of the width of said passage.

In said WO document, the centering of the conveying module in its passage occurs automatically during the adjustment of the width of the corresponding passage, by means of a mechanism comprising a pair of followers, in the form of wedges that are synchronized in their movements, said wedges being in contact with the walls of the corresponding passage and guided in the support for said conveying module; this support comprises jaws into which the wedges can slide and be extended or retracted to reflect the movement of the walls with which they are in contact. These jaws are centered in the mid-plane of the passage and their motion is opposed by a spring which tends to press said wedges against the walls of the passage.

However, malfunctions in these mechanisms are seen, sometimes including difficulties in moving the wedge-type followers. Such malfunctions originate from dust and dirt introduced into said mechanisms. Such soiling is carried along by the lubricants placed on the belts or bands of the conveyors in order to reduce friction between the containers being conveyed and said belts or bands.

Jamming and/or blockage of the wedges of the positioning mechanism can result in incorrect centering of the conveying modules in the corresponding passage; it can also disrupt the distance adjustment of the walls during format changes.

The wedges are not attached, or fixed, to the walls; they are simply pressing against these walls due to the pressure exerted by the spring on the jaws that hold said wedges. These wedges are supposed to change position automatically with the movement of the walls with which they are in contact.

The invention proposes a novel arrangement of the system for automatically centering the conveying modules in their respective passage. Said arrangement overcomes the difficulties related to the presence of soiling on said conveying modules, and in particular at the entrance and exit of the regulating module.

The invention also proposes, in association with this system for automatically centering the conveying modules, a system which allows adjusting the width of each passage while providing unequalled precision in the parallelism of the walls to each other and in the uniformity of the width, said systems preferably being combined together to form a multifunctional adjustment system which thus integrates multiple functions.

The regulating unit of the invention comprises, in a region located at each of its ends, between two adjacent walls, means for centering each conveying module between the walls adjacent to it, said means enabling a centering of said module which is both automatic and synchronized with the movement of said adjacent walls, and these means consist of arms of the same length forming compasses between two adjacent walls, said compasses being hinged at their ends onto said adjacent walls, at a same level and on a same horizontal line, and their central hinge is integrally attached to the conveying module corresponding to each compass, by means of a direct and permanent appropriate connection, for example a sliding connection, arranged in the mid-plane of the corresponding passage.

In another arrangement of the invention, the walls are connected to each other by a pantograph system with rhombuses which automatically adjust the distance separating said walls to the same value, and said distance is adjustable by a screw-nut system arranged at each end of the regulating unit, said screw-nut system comprising a shaft equipped with two threads of opposite threading cooperating with nuts integrally attached to the side walls for example.

Still according to the invention, the regulating unit comprises, between the arms of each compass and the arms of each rhombus of the pantograph which are parallel to said arm of each compass, a connecting element which is located in the mid-plane of each passage, said connecting element consisting of a connecting rod which cooperates with the corresponding support of the conveying module.

In another arrangement of the invention, each connecting rod forms, with its adjacent walls, with the arms of the compass, and with the arms of the pantograph which are parallel to said arms of the compass, a pair of adjacent deformable parallelograms in which said connecting rod forms the common side, said pair of parallelograms maintaining a highly precise parallelism between said walls.

Still according to the invention, the assembly consisting of the pantograph, the compasses, and the connecting rods, is installed in a region located at each end of the regulating unit, in a vertical plane, below the level of the active surface of the conveying modules on which the containers are traveling, and the means for maneuvering these pantographs are coordinated with each other by a motorized or non-motorized control unit.

In another arrangement of the invention, the connecting rods arranged between the arms of the compasses and the arms of the pantograph act as rails, said connecting rods each respectively cooperating with a part which acts as a support, said support being arranged at the end of each module and comprising a vertical borehole which allows the corresponding connecting rod to slide within it.

In another arrangement of the invention, the support provided in the region located at each end of the conveying modules is in the form of a block arranged to accept the corresponding end of said conveying module and to cooperate with said end, said support comprising two parallel boreholes arranged horizontally and which each cooperate with a pair of rails extending transversely between the lateral sides of the regulating unit, and also comprising a vertical borehole cooperating with the vertical rod connecting the compass to the pantograph.

Still according to the invention, each support for the conveying modules comprises a pin projecting from its upper surface, said pin cooperating with a base arranged in the corresponding end of said conveying module, said base comprising a socket which immobilizes said module on its support and which also facilitates changing said module if needed.

In another arrangement of the invention, the walls forming the guiding passages for the containers are attached, in the regions located at the ends of the regulating unit, to the slides supporting the compasses and the pantograph, and this attachment is achieved by means of plates, said plates clasping said walls and being assembled onto said slides by appropriate means.

Still according to the invention, at least one of the walls forming the guiding passages for the containers comprises, at the entrance side of the regulating unit, a small window which allows monitoring and verifying the position of the fingers before their insertion between two consecutive containers arriving on the conveying module as they are advanced by the upstream feeder conveyor.

To enable its execution, the invention is explained in a sufficiently clear and complete manner in the following description, also accompanied by drawings in which.

Figure 1:
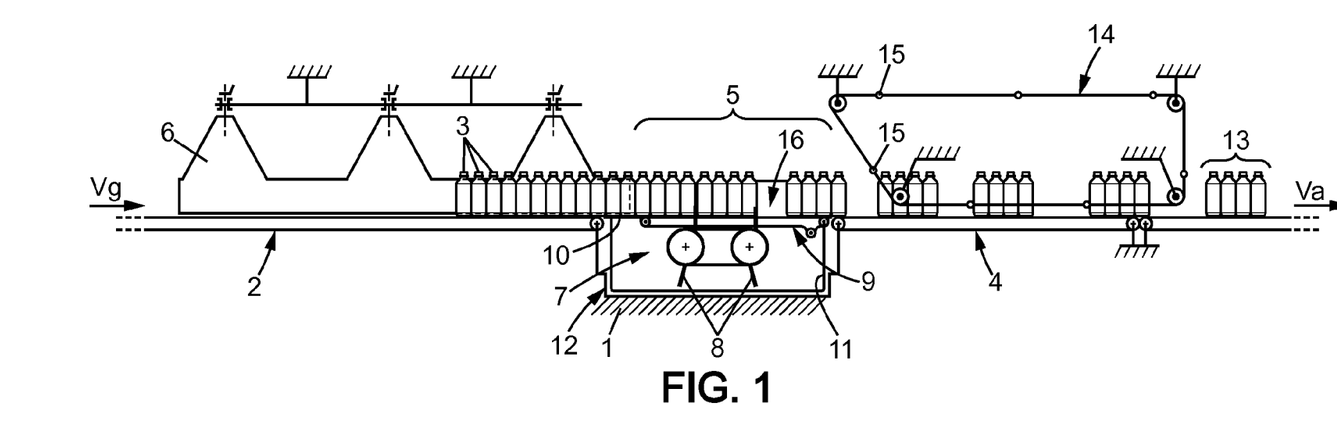
FIGS. 1 and 2 correspond to installations able to receive the regulating unit of the invention which is equipped with the multifunctional system for centering the conveying modules and adjusting the width of the passages, and in particular an installation which operates either in a mode of ungrouping streams of containers and preparing batches referred to as "SAF" (Selection by Adjustable Fingers), or in a mode of ungrouping streams and preparing batches referred to as "SRF" (Selection by Regulated Flow)

The installation represented in FIG. 1 comprises a general frame 1 onto which are assembled:

an endless belt feeding conveyor 2, upstream, which conveys in a continuous manner and at a speed Vg a stream of containers 3, particularly containers having a circular or oval cross-section, or with facets, for example bottles, flasks, etc.;

an endless belt conveyor 4, downstream, which advances at a speed Va in order to carry the batches of containers to a packaging machine or other device, not represented, and, between said upstream conveyor 2 and said downstream conveyor 4, a regulating unit 5, said regulating unit 5 controlling the speed at which the stream of containers 3 advances.

These containers 3 arrive in several lines on the upstream conveyor 2, guided by walls 6 which delimit the passages, and these containers 3 then pass through the regulating unit 5, also within passages, said passages being arranged to offer high precision in the guiding of said containers 3, as detailed in said WO document.

This regulating unit 5 is in the form of an interchangeable tool which comprises means for controlling and setting the speed of the containers 3 between the upstream conveyor 2 and the downstream conveyor 4, said means first consisting of a conveying system 7 comprising regulating fingers 8 which act as stops and also consisting of several conveying modules 9 which extend longitudinally within each passage of said regulating unit, between the dead plate 10 located at the entrance to said regulating unit 5 and forming the connection with the upstream conveyor 2.

The regulating fingers 8 bar the passage of the containers 3 into the passages of the regulating unit 5, acting as stops, and they are mobile in order to retain and accompany the containers 3 within said unit 5.

The conveying system 7 with its fingers 8, and the conveying modules 9 with their dead plate 10, are integrally attached to the same frame 11, said frame 11 being inserted into a cradle 12 arranged on the general frame 1 of the installation.

Figure 2:
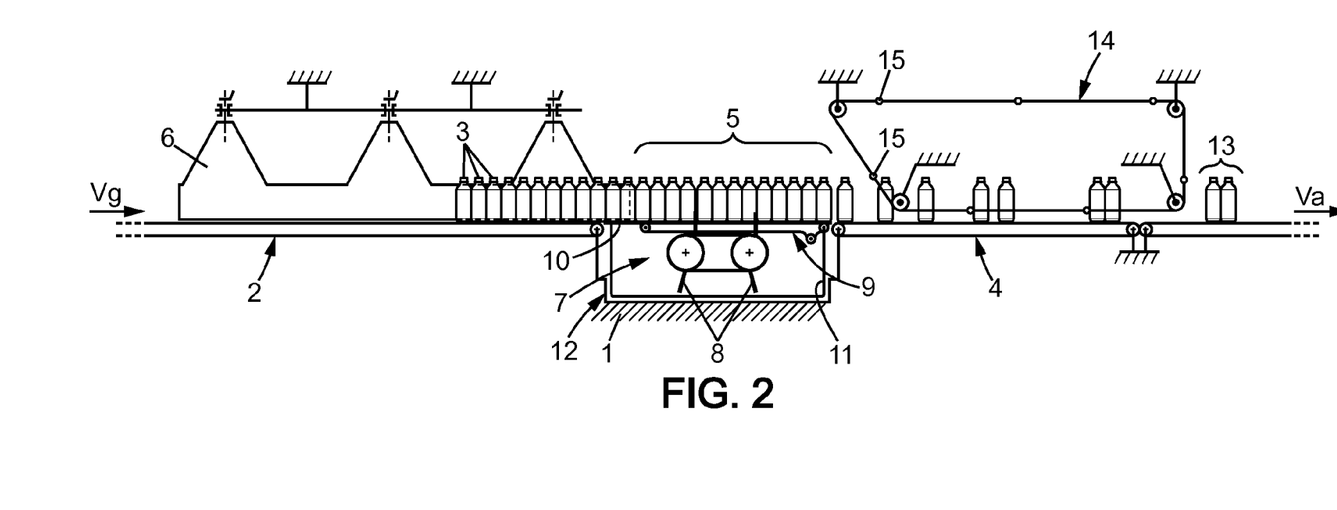

FIG. 1 described above concerns a mode for selecting and ungrouping containers 3 referred to as SAF, or Selection by Adjustable Fingers; FIG. 2 uses the same elements for a different selection and separation mode, referred to as SRF for Selection by Regulated Flow. In both cases, it involves forming batches 13.

In the case of the SRF ungrouping mode, represented in FIG. 2, the containers 3 are ungrouped row by row at the downstream end of the regulating unit 5 and these rows are taken up by an orbital-type conveying device referred to as a cycler 14, said cycler 14 comprising bars 15 which are inserted into the space formed between two consecutive rows or, depending on the case, and in particular depending on the number of rows in the batch, between the groups of rows that form said batch.

In the SAF ungrouping mode, the cycler 14 can also be used to compact the batch 13 longitudinally and, depending on the case, with appropriate equipment consisting for example of lateral walls, not represented, to compact the containers transversely to prepare them for sending them on to the next conveyor, which feeds a packaging machine (not represented).

In order to achieve proper selection and ungrouping of said containers 3, these two selection modes, SAF or SRF, in which the goal is to prepare batches 13 of containers 3, require very high precision in the guidance of said containers 3, both for the conveying modules 9 and for the walls 16 which delimit the passages. It is these walls which guide the containers, but this guidance and the positioning of the containers 3 also depend on the position of the fingers 8, said fingers 8 being in the form of tines which straddle the edge of a window arranged in each wall 6 and through which pass the supporting elements of said fingers 8. The precision in positioning the containers 3 relative to the fingers 8 depends on the precision in centering said containers 3 in the passages, and it is this precision of the containers 3 relative to the fingers 8 which determines the regularity of the leading side of the containers 3 during ungrouping and batch formation.

Figure 3:
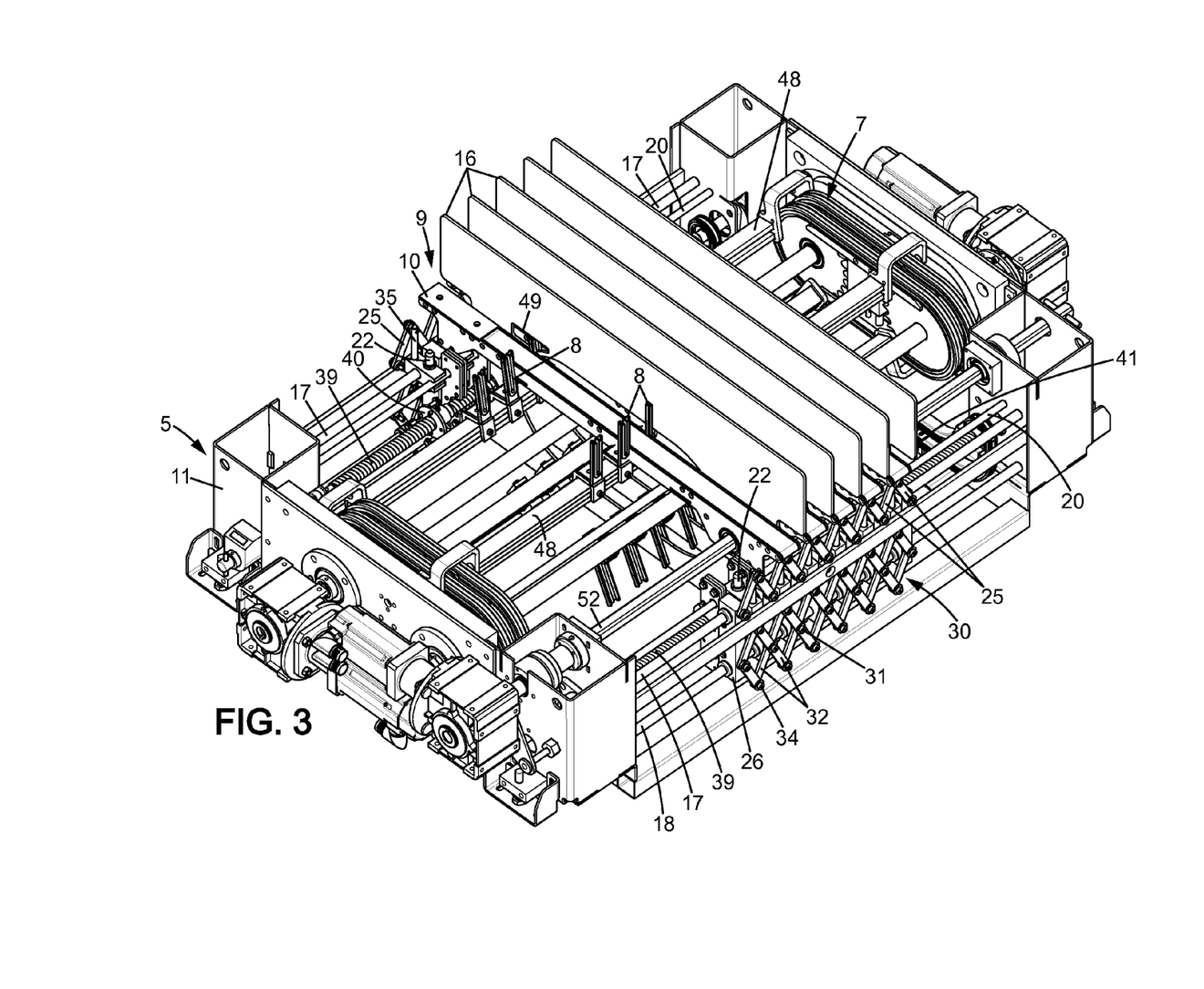
FIG. 3 is a partial perspective view of the regulating unit, showing the placement of the system for automatically centering conveying modules and the system for adjusting the width of the walls delimiting the passages through which the containers travel.

As represented in FIG. 3, walls 16 are arranged on each side of each conveying module 9 in order to delimit laterally the different passages of the regulating unit 5. These walls 16 are guided transversely, at the entrance and exit of said regulating unit 5, on a pair of rails 17 and 18 vertically spaced apart.

Figures 4, 5:
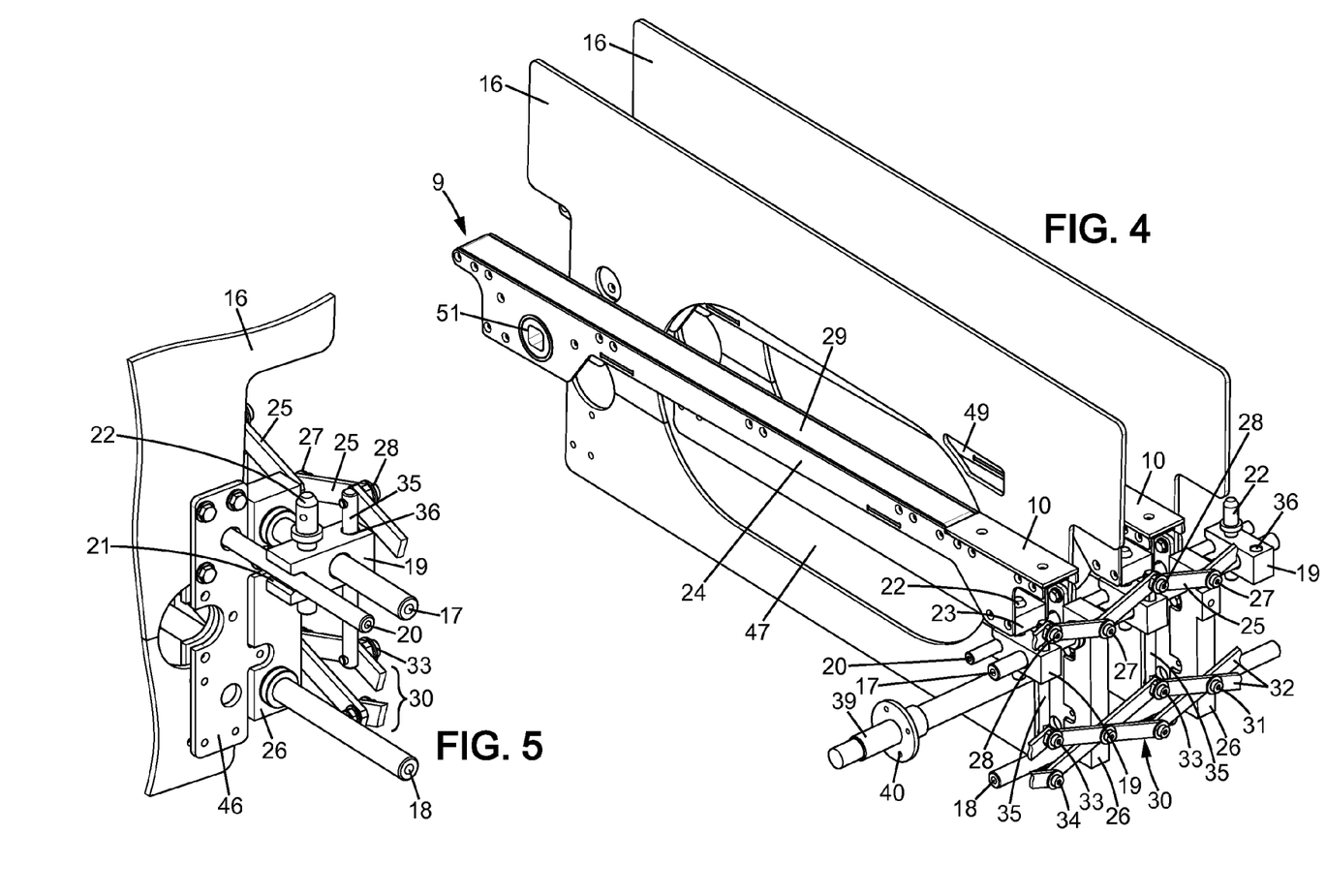
FIG. 4 represents a partial and more detailed view of the mechanism for centering the conveying modules and the mechanism for adjusting the passage walls.
FIG. 5 is a partial perspective view specifically showing the mechanism for maneuvering a wall and the mechanism for maneuvering the support for the end of a conveying module.

The upper rails 17 also serve as a transverse guide for the various conveying modules 9. As represented in FIG. 4, the end of the conveying module 9 is supported by a part which acts as a support 19, said support 19 being guided on the upper rail 17 as well as on a supplemental rail 20, parallel to said rail 17 and located at the same level but further inside the regulating unit 5. One will note in FIG. 5 that the support 19 comprises a simple recess 21, or slot, for cooperating with the supplemental rail 20, said rail 20 serving simply to hold the support 19 in position, providing a rotation prevention function.

This support 19 comprises a pin 22 which serves to center and position the corresponding end of the conveying module 9, said end of said module 9 being equipped with a base 23 which is arranged to accept said pin 22. The base 23 is surrounded by two plates 24 acting as a frame for the conveying module 9.

To keep this conveying module 9 centered in the vertical mid-plane of its passage, the support 19 is connected to the walls 16 which delimit said passage, by means of a pair of arms 25 of the same length which form a compass, or dihedral, between two adjacent walls; a series of compasses extends horizontally along a same line from passage to passage, transversely, at the entrance and exit of the regulating unit 5.

The arms 25 of the compasses are of the same length and they have one end which is hinged onto the adjacent walls 16, at the same level and on a same horizontal line, and the other ends of said arms 25 come together in a hinge, this central hinge of the compass being integrally attached to said conveying module 9 by means of a sliding connection arranged in the mid-plane of the corresponding passage.

The arms 25 are hinged onto the walls 16 and, in particular, onto slides 26 to which said walls 16 are attached by means which will be detailed below. Each slide 26 comprises, in its upper part, at the level of the upper rail 17, a hinge pin 27 which receives one of the ends of the arms 25, the other end of each arm 25 being hinged on a hinge pin 28 shared by two arms 25 positioned between two adjacent walls 16, this hinge pin 28 being located in the mid-plane of each passage of the regulating unit 5 and, in addition, being connected to the support 19 of the corresponding module 9.

The hinge common to the two arms 25 at the support 19, which is achieved by the hinge pin 28, constitutes, with said arms 25, the connecting means between the walls 16 and the corresponding conveying module 9. This connecting means is mobile; it guides the hinge pin 28 in the mid-plane of the corresponding passage, for example by sliding. A direct and permanent link between the walls 16 and the conveying module 9 is thus obtained, which allows guaranteeing the optimum position of this module 9 and in particular of its endless belt 29, said belt 29 being centered in the mid-plane of the corresponding passage.

In a preferred embodiment of the invention, this connection between the hinge pin 28 and the support 19 for the conveying module 9 is associated with specific means which allow adjusting the distance between the walls 16 forming the passages, in order to adapt the width of said passages to the dimensions of the containers 3 which are passing through them.

To obtain maximum precision in the position of the walls 16, the distance separating said walls 16 is achieved, at the entrance and exit of the regulating unit 5, by means of a mechanism comprising, in particular, a pantograph 30 which extends transversely below the level of the arms 25, at the level of the lower rail 18. This pantograph 30 consists of a succession of rhombuses arranged horizontally across the width occupied by the walls 16, said rhombuses being hinged, by means of hinge pins 31, on the slides 26 which support said walls 16, substantially at the level of the lower rail 18. The hinge pins 31 are arranged at the center of the crosspieces formed by the arms 32 of the pantograph 30 and on the half-arms 32 attached to the side walls 16.

The free angles of the rhombuses of the pantograph 30, which are located in the mid-plane of each passage, are hinged on hinge pins 33 and 34 which are located on each side, respectively above and below the line which passes through the hinge pins 31. The hinge pins 34 create a simple connection of the ends of two adjacent arms 32.

Figure 6:
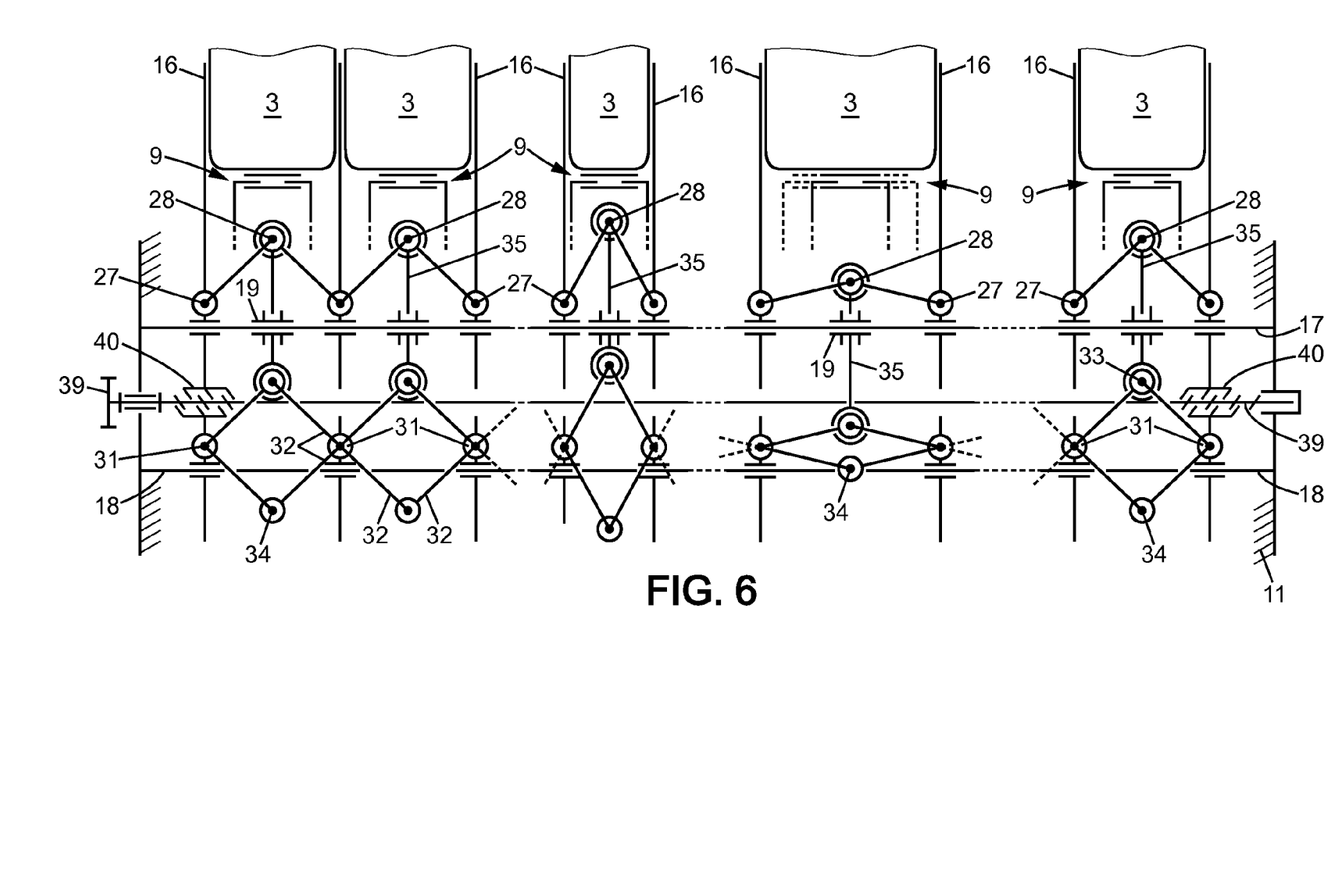
FIG. 6 represents a schematic and partial view of several examples of passage width adjustments, and the position of the adjusting systems for the walls of said passages and for the conveying modules.

One will note in FIGS. 4 to 6 that a connecting element, in the form of a connecting rod 35, extends between the hinge pins 33 of the arms 32 of the pantograph 30 and the hinge pins 28 of the compasses formed by the arms 25. These connecting rods 35 are always located in the mid-plane of each passage and they cooperate with each supporting part 19 in order to move it and in particular to synchronize the movement of the conveying module 9 with the movement of the adjacent walls 16.

Each support 19 comprises a borehole 36 which is arranged to accept the corresponding connecting rod 35; this connecting rod 35 is in the form of a cylindrical bar which slides in the borehole 36 in order to follow the movements of the pantograph 30 and of the compasses formed by the arms 25. These various connecting rods 35 act as a follower, meaning they accompany the movement of the walls 16 and force the conveying modules 9 to remain centered in the mid-plane of their passage which is formed by said walls 16.

The connecting rods 35 fulfill an important complementary role with the walls 16, because they constitute, between two adjacent walls 16, the common side of a pair of adjacent deformable parallelograms.

In fact, as represented in FIGS. 4 and 6 in particular, the walls 16 together with the arms 25 of the compasses and the upper arms 32 of the pantograph 30, and with the connecting rods 35, form parallelograms, and in particular a pair of adjacent parallelograms for each passage, between two adjacent walls 16. Thus one obtains a very high precision in positioning these walls 16 and, in particular, in their parallelism; the verticality of these walls is maintained and the distance separating them is regular and completely uniform.

All these maneuvering mechanisms for the walls 16 and the conveying modules 9, meaning the pantograph 30 and the compasses formed by the arms 25, are arranged in a region located at each end of the regulating unit 5, below the level of the surface on which the containers 3 are being conveyed.

The extension and retraction of the pantograph 30 occurs by a screw-nut system arranged at each end of the regulating unit 5: —a shaft 39 extending transversely and comprising two threads of opposite threading arranged one on each side of the mid-plane of the regulating unit 5, —and two nuts 40 each cooperating with each screw portion, said nuts 40 preferably being placed on the outermost side walls 16.

Figure 7:
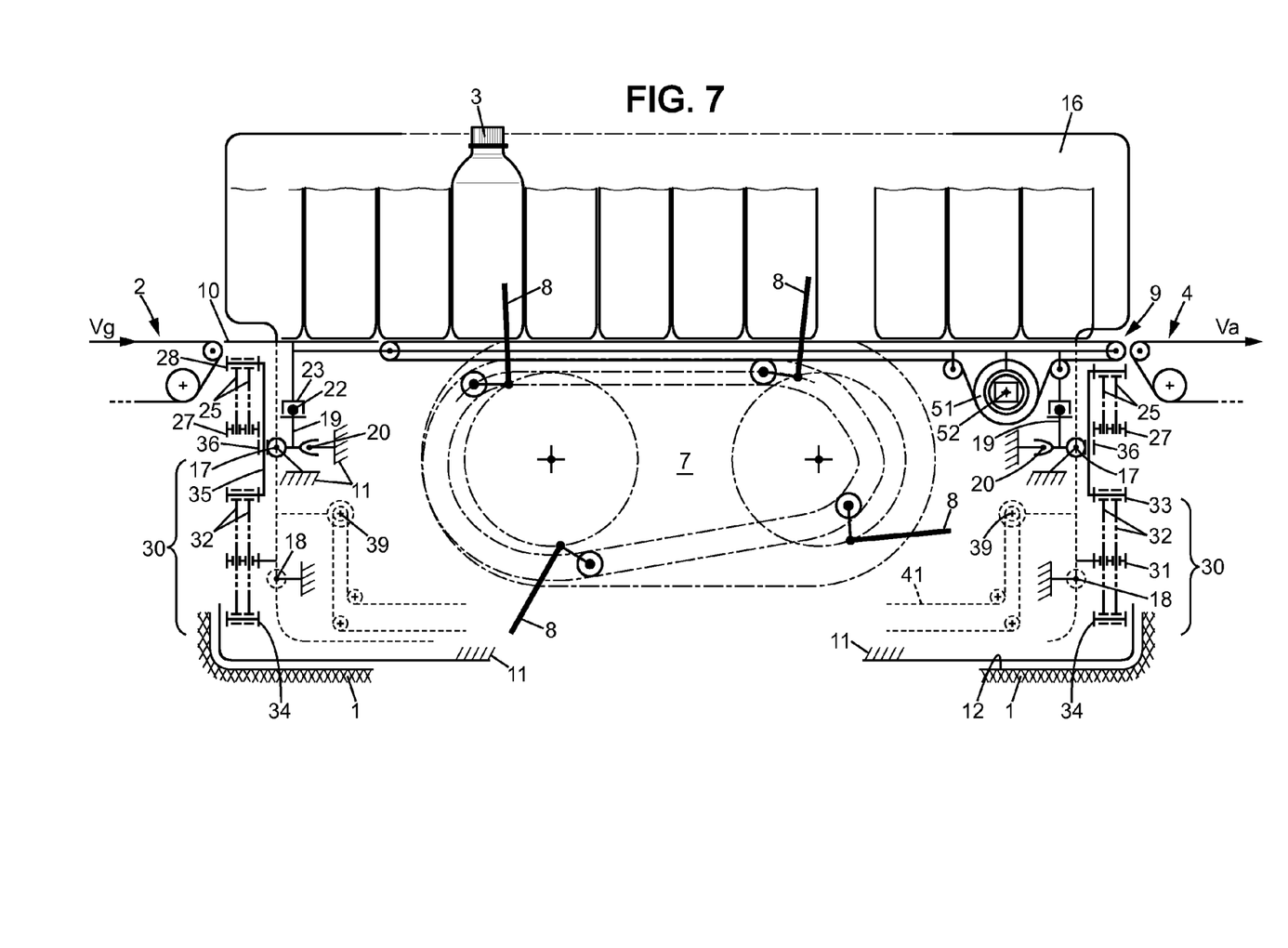
FIG. 7 represents, in the form of a simplified functional diagram, the main elements of a regulating unit equipped with the multifunctional system for adjusting the width of the passages and centering the supports of the various conveying modules within said passages.

The shafts 39 can be manipulated manually or by an appropriate motorized element. These two shafts 39 are synchronized by an appropriate continuous chain type of linkage 41, for example, said continuous chain passing below the conveying system 7 which comprises the regulating fingers 8, as represented in FIGS. 3 and 7.

In FIG. 5, one will note that the wall 16 is attached to the slide 26 which supports the hinge pins 27 of the arms 25 of the compass and which supports the hinge pin 31 of the pantograph; this attachment of the wall 16 to the slide 26 is achieved by means of plates 46 which clasp said wall 16, said plates 46 being arranged on each side of said wall 16 and being assembled onto said slide 36. The various walls 16 are mounted in this manner on each slide 26, in each end region of the regulating unit.

In FIG. 4, one can see a partial representation of a wall 16 which contains a large window 47 to allow the passage of the conveyance system 7 and in particular the passage of the crossmembers 48, visible in FIG. 3, which support the various regulating fingers 8.

One will also note on the entrance side of the regulating unit, near the dead plate 10 of the conveying module 9, a small window 49 which allows monitoring and verifying the position of the finger 8 before its insertion between two consecutive containers 3 arriving on the continuous belt 29 of the conveying module 9 and being advanced by the upstream feeder conveyor 2. This small window 49 is arranged in at least one of the walls 16, preferably the side walls.

FIG. 6 shows several possibilities for the adjustment of the width of the passages and the cooperation between the arms 32 of the pantograph 30 and the compasses formed by the arms 25.

The arms 25 are hinged on the slides 26 and their central hinge 28 is located in the extension of the vertical diagonal of the rhombuses which form said pantograph 30. One thus obtains a succession of parallelograms connected to each other, as detailed above, said parallelograms being formed by the arms 32 of the upper portion of the pantograph 30 and by the arms 25, with a connecting rod 35 forming the connection between the hinge pin 28 of said arms 25 and the hinge pin 33 of said arms 32.

Still with regards to FIG. 6, one will note that a substitution of the conveying modules 9 can be performed if necessary for the passage width. A conveying module 9 of small width can be substituted for a module 9 of larger width in order to offer good stability for containers 3 during their travel through the regulating unit 5.

FIG. 7 represents an elevated view, in the form of a simplified functional diagram, of the regulating unit 5 and its main elements. This regulating unit 5 is positioned between the upstream conveyor 2 and the downstream conveyor 4, and it is in the form of a cartridge which weighs several hundred kilograms.

This cartridge comprises a frame 11 to which are assembled the elements that accompany the containers 3, meaning the system 7 of fingers 9, the conveying modules 9, and the walls 16 which form the passages. This cartridge also comprises the elements for adjusting the width of said passages in order to adapt it to the dimensions of said containers 3 and for correctly positioning said conveying modules 9 by continuously maintaining them in the mid-plane of their passage.

Thus, in the region located at the entrance and exit of this cartridge, there is a mechanism which comprises the compasses formed by the arms 25 and which comprises the pantograph 30, said pantograph being coupled to said arms 25 by means of connecting rods 35. These connecting rods 35, which act as followers, cooperate with the supports 19 onto which the conveying modules 9 are simply placed.

The endless belt 29 of these conveying modules 9 is driven by a pulley 51, said pulley 51 itself being driven by a shaft 52. This shaft 52 keeps the modules in place and can be removed in order to change them when, as indicated above relative to FIG. 6, the variation in the width of the passages requires changing these modules 9 in order to install a wider or narrower one depending on the case.

This change is greatly facilitated by the assembly of the conveying modules 9 onto their support 19, as this assembly only requires fitting the base 23 onto the pin 22 which projects vertically from each support 19.

One will also note in FIG. 7 the shafts 39 which allow maneuvering the walls 16 in order to adjust the width of the passages and which simultaneously establish and maintain the centering of the conveying modules 9 in their respective passage. These shafts 39 are arranged at each end of the regulating unit, towards the inside, behind the centering mechanisms (pantograph 30 and arm 25), and are connected to each other, as indicated above, by means of a continuous chain system 41 which keeps them synchronized.

The invention claimed is:

1. A regulating unit for an installation for preparing batches of bottle-type containers, comprising at least two guiding passages separated by walls for which a distance between said walls is adjustable, each passage being equipped with a conveying module which supports and advances containers to be regulated, said unit achieving regulation of a stream of containers by sets of fingers and placed between an upstream conveyor and a downstream conveyor, wherein said regulating unit comprises, in a region located at each of two ends of said regulating units, between two adjacent walls, a mechanism for centering each conveying module, said mechanism comprising first arms of same length forming a compass between two adjacent walls, said first arms having one end which is hinged onto a respective one of said adjacent walls, at a same level and on a same horizontal line, and the other ends coming together in a hinge which is integrally attached to said conveying module by a sliding connection arranged in a mid-plane of a corresponding passage.

2. The regulating unit according to claim 1, wherein said walls are connected to each other by a pantograph system which automatically adjusts the distance separating said walls to a same value and said distance is adjustable by a screw-nut system arranged at each end of said regulating unit, said screw-nut system comprising a shaft equipped with two threads of opposite threading cooperating with nuts integrally attached to side walls.

3. The regulating unit according to claim 2, comprising, between said first arms of each compass and second arms of each rhombus of said pantograph, a connecting element which is located in said mid-plane of each passage, said connecting element comprising a connecting rod which cooperates with a corresponding support of each conveying module.

4. The regulating unit according to claim 3, wherein each connecting rod forms, with adjacent walls, with said first arms of said compasses, and with said second arms of said pantograph which are parallel to said first arms, a pair of adjacent deformable parallelograms in which said connecting rod forms a common side.

5. The regulating unit according to claim 4, wherein an assembly comprising said pantograph, said compasses formed by said first arms, and said connecting rods, is installed in a region located at each end of said regulating unit, in a vertical plane, below a level of an active surface of said conveying modules on which the containers are traveling, and coordinated maneuvering of said pantographs is by a control unit.

6. The regulating unit according to claim 5, wherein said connecting rods arranged between respective ones of said pantographs and said compasses formed by said first arms act as rails, said connecting rods each respectively cooperating with a part which acts as a support for each conveying module, said support comprising a vertical borehole which allows the corresponding connecting rod to slide within said borehole.

7. The regulating unit according to claim 6, wherein said support provided at each end of said conveying modules is in the form of a block arranged to accept a corresponding end of said conveying module and to cooperate with said corresponding end, said support comprising two parallel boreholes arranged horizontally and each cooperating with a rail extending transversely between the lateral sides of said regulating unit, and said support comprising said vertical borehole cooperating with said rod connecting said compass to said pantograph.

8. The regulating unit according to claim 7, wherein said support comprises a pin projecting from an upper surface of said support, said pin cooperating with a base arranged in a corresponding end of said conveying module, said base comprising a socket which immobilizes said conveying module on said support and said socket also facilitating a changing of said conveying module if needed.

9. The regulating unit according to claim 5, wherein said walls forming said guiding passages for the containers are attached to slides supporting respective ones of said compasses and said pantographs, and this attachment is achieved by plates which clasp said walls and which are assembled onto said slides.

10. The regulating unit according to claim 9, wherein at least one of said walls forming said guiding passages for the containers comprises a small window which allows monitoring and verifying a position of said fingers before insertion of said fingers between two consecutive containers arriving on a conveying module as the containers are advanced by the upstream conveyor.

* * * * *